US012679456B2

(12) United States Patent
Nagavally et al.

(10) Patent No.: US 12,679,456 B2
(45) Date of Patent: Jul. 14, 2026

(54) VEHICLE STEERING MODES

(71) Applicant: Ford Global Technologies, LLC, Dearborn, MI (US)

(72) Inventors: Rahul Reddy Nagavally, Dearborn, MI (US); Ajinkya Joshi, Dearborn Heights, MI (US); Souri Gadepalli, Dearborn, MI (US); Kevin Wegienka, Novi, MI (US); Mengxiong Wan, Troy, MI (US); Shane Larkin, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 18/624,455

(22) Filed: Apr. 2, 2024

(65) Prior Publication Data

US 2025/0304159 A1 Oct. 2, 2025

(51) Int. Cl.
*B62D 6/10* (2006.01)

(52) U.S. Cl.
CPC ...................................... *B62D 6/10* (2013.01)

(58) Field of Classification Search
CPC ........................................................ B62D 6/10
See application file for complete search history.

(56) References Cited

U.S. PATENT DOCUMENTS

| | | | |
|---|---|---|---|
| 8,457,827 B1 | 6/2013 | Ferguson et al. | |
| 9,187,117 B2 | 11/2015 | Spero et al. | |
| 9,817,399 B2 | 11/2017 | Braunstein et al. | |
| 10,754,341 B2 | 8/2020 | Li et al. | |
| 11,167,768 B2 * | 11/2021 | Shiraishi | B60W 60/007 |
| 11,292,493 B2 | 4/2022 | Jones et al. | |
| 2001/0007966 A1 | 7/2001 | Sielagoski et al. | |
| 2012/0109461 A1 * | 5/2012 | Nitta | B62D 6/003 701/41 |
| 2015/0274201 A1 * | 10/2015 | Kunihiro | B62D 15/025 701/41 |
| 2016/0347175 A1 * | 12/2016 | Yamashita | B60W 30/18163 |
| 2018/0120844 A1 * | 5/2018 | Okamoto | B60W 50/082 |
| 2019/0009816 A1 * | 1/2019 | Moreillon | B62D 6/08 |
| 2019/0161116 A1 * | 5/2019 | Moreillon | B62D 15/025 |
| 2020/0361494 A1 * | 11/2020 | Zheng | B62D 6/10 |
| 2022/0135039 A1 | 5/2022 | Jardine | |
| 2022/0379920 A1 | 12/2022 | Yang et al. | |
| 2025/0187659 A1 * | 6/2025 | Miller | B62D 15/025 |

FOREIGN PATENT DOCUMENTS

| | | |
|---|---|---|
| JP | 3239727 B2 | 12/2001 |
| RU | 2778327 C1 | 8/2022 |

* cited by examiner

*Primary Examiner* — Carl C Staubach

(74) *Attorney, Agent, or Firm* — Frank A. MacKenzie; Brooks Kushman P.C.

(57) ABSTRACT

A system includes a computer including a processor and a memory storing instructions executable by the processor to determine a steering torque of a vehicle and to select one of a hands-on mode or a hands-free mode for operating the vehicle along a portion of the roadway based on comparing the steering torque to a steering torque threshold.

18 Claims, 5 Drawing Sheets

VEHICLE STEERING MODES

BACKGROUND

Vehicles can include systems or features to assist a human operator with various vehicle operations. Such systems, sometimes referred to as Advanced Driver Assistance Systems (ADAS), can include features such as adaptive cruise control, braking, blind spot monitoring, lane keeping assistance, etc. Various vehicle sensors may be provided to support ADAS and other features, such as cameras, lidars, radars, ultrasonic sensors, etc.

DETAILED DESCRIPTION

Figure 1:
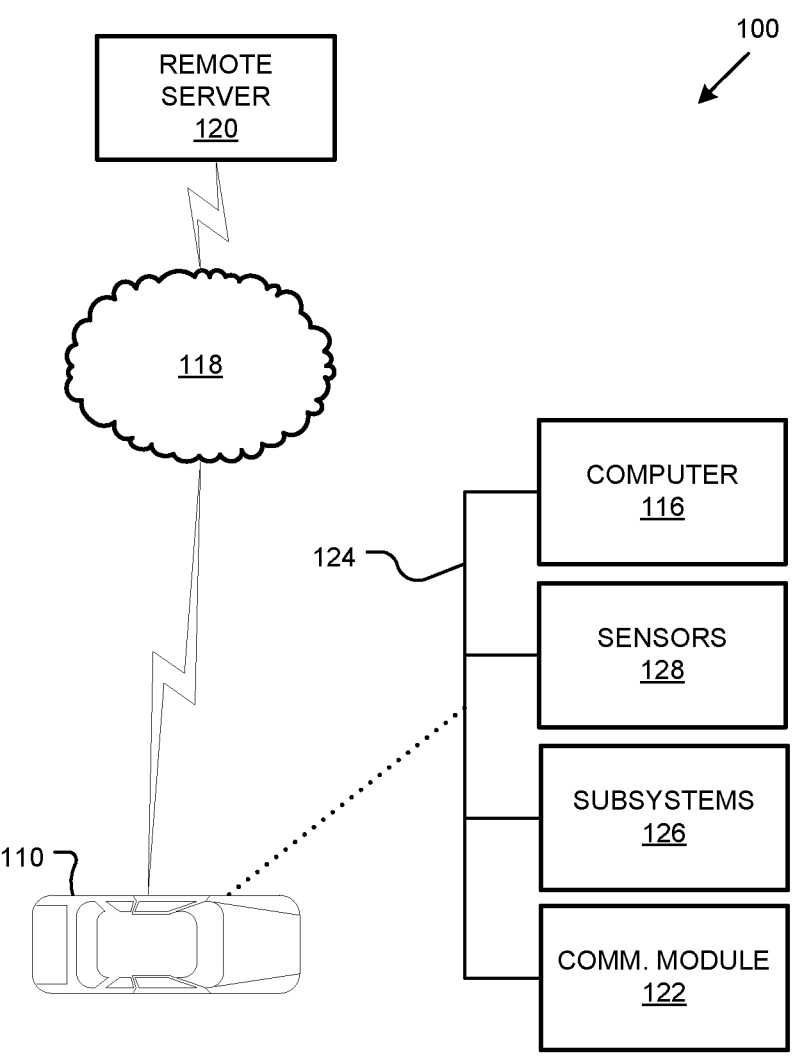
FIG. 1 is a block diagram of an example system for operating vehicle steering.

With reference to FIGS. 1-4, a system 100 may be provided to manage operation of a vehicle 110 along a roadway 114 that is a curved portion 112*b*, i.e., a curvature of the portion 112*a*, 112*b*, 112*c* of the roadway 114. A computer 116 of the vehicle 110 can select a steering mode that specifies whether an operator's hand or hands are to be placed on a steering wheel 212 or need not be placed on the steering wheel 212, i.e., the steering mode can be one of a hands-free mode or a hands-on mode. The steering mode can be selected for a portion 112*a*, 112*b*, 112*c* of the roadway 114 that is a curved portion 112*b* based on comparing a requested steering torque to a steering torque threshold determined or specified for the portion 112*b* of the roadway 114. The steering torque threshold is typically an amount of steering torque that the vehicle 110 is capable of maintaining given the vehicle's speed, lateral acceleration, yaw rate, and/or other factors. A torque sensor 128 can be used to determine an amount of torque applied to a steering wheel 212, e.g., by an operator's hand and/or due to some other source. As the vehicle 110 approaches the curved portion 112*b* of the roadway 114, the steering torque to operate the vehicle 110 on a path along the curvature of the curved portion 112*b* of the roadway 114 is determined and compared to the steering torque threshold. When the steering torque determined for the portion 112*b* is greater than the steering torque threshold, the computer 116 may select the hands-on mode for the vehicle 110 around the curvature of the curved portion 112*b* of the roadway 114, and may execute instructions to actuate components to operate the vehicle 110 in the hands-on mode. When the steering torque determined for the curvature is less than the steering torque threshold, the computer 116 may select the hands-free mode such that the computer 116 may actuate components to operate the vehicle 110 in the hands-free mode, including steering the vehicle 110 on a path according to the curvature of the curved portion 112*b* of the roadway 114.

A system includes a computer including a processor and a memory storing instructions executable by the processor to determine a steering torque of a vehicle and to select one of a hands-on mode or a hands-free mode for operating the vehicle along a portion of the roadway based on comparing the steering torque to a steering torque threshold.

The instructions may further include instructions to determine a speed and a lateral acceleration of the vehicle, and may include to select the hands-on mode or the hands-free mode along the portion of the roadway is further based on comparing the speed to a speed threshold and the lateral acceleration to a threshold lateral acceleration.

The instructions may further include instructions to select the hands-on mode at the portion of the roadway is further based on the lateral acceleration and the steering torque exceeding the threshold lateral acceleration and the steering torque threshold.

The speed threshold may include an upper limit and wherein the instructions may further include to, based on a determination that the speed is greater than the speed threshold, adjust the speed to be below the upper limit.

The steering toque threshold may be based on a lateral acceleration.

The steering torque threshold may be based on a speed of the vehicle.

The selection may be initiated based on approaching a curved portion of the roadway upcoming within a specified time from the curved portion.

The selection of one of the hands-on mode or the hands-free mode may be initiated based on a speed of the vehicle being greater than an upper limit.

The instructions may further include instructions to select one of a hands-on mode and a hands-free mode for operating the vehicle along a second portion of the roadway.

A method includes determining a steering torque of a vehicle and selecting one of a hands-on mode or a hands-free mode for operating the vehicle along a portion of the roadway based on comparing the steering torque to a steering torque threshold.

The method may further include determining a speed and a lateral acceleration of the vehicle, and selecting the hands-on mode or the hands-free mode along the portion of the roadway is further based on comparing the speed to a speed threshold and the lateral acceleration to a threshold lateral acceleration.

Selecting the hands-on mode at the portion of the roadway may be further based on the lateral acceleration and the steering torque exceeding the threshold lateral acceleration and the steering torque threshold.

The speed threshold may include an upper limit and may further include, based on a determination that the speed is greater the speed threshold, adjusting the speed to be below the upper limit.

The steering toque threshold may be based on a lateral acceleration.

The steering torque threshold may be based on a speed of the vehicle.

The selection may be initiated based on approaching a curved portion of the roadway upcoming within a specified time from the curved portion.

The selection of one of the hands-on mode or the hands-free mode is initiated based on a speed of the vehicle being greater than an upper limit.

The method may include selecting one of a hands-on mode and a hands-free mode for operating the vehicle along a second portion of the roadway.

With reference to FIG. 1, a system 100 including a vehicle 110 includes a computer 116. The computer 116 includes a processor and a memory storing instructions executable by the processor. The instructions include instructions to determine a steering torque of a vehicle 110 and to select one of a hands-on mode or a hands-free mode for operating the vehicle 110 along a portion 112*a*, 112*b*, 112*c* of the roadway 114 based on comparing the steering torque to a steering torque threshold, and to then actuate vehicle components to operate the vehicle 110 in the selected mode.

The vehicle 110 may be any suitable ground vehicle, typically a vehicle with three or more wheels, e.g., a passenger or commercial automobile such as a sedan, a coupe, a truck, a sport utility, a crossover, a van, a minivan, a taxi, a bus, etc.

The system 100 includes at least one vehicle, e.g., as shown in FIG. 1, and may further include a wide area network 118 to provide communication between the vehicle 110 and a remote server 120. Further, the system 100 could include multiple vehicles (although not shown in the figures), which could be selectively in communication with each other and/or the remote server 120 according to a suitable protocol for vehicle-to-vehicle and/or vehicle-to-infrastructure communications. The vehicle 110 includes a computer 116, one or more sensors 128, one or more vehicle subsystems 126, as mentioned above, as well as a communication module 122.

The computer 116 includes a processor and a memory, and is arranged for communication on a vehicle network 124. The memory includes one or more forms of computer readable media, and stores instructions executable by the computer 116 for performing various operations, including as disclosed herein. Additionally, it is to be understood that the computer 116 referred to herein could be provided in the form of a plurality of computing devices typically provided in a vehicle (the computer 116 could be embodied as multiple vehicle electronic control unites (ECUs) or the like); processing disclosed herein as carried out by the computer 116 for ease of description may be distributed among a plurality of devices as discussed further below, and the vehicle network 124 may be used for communications between devices represented as the computer 116 in this disclosure (e.g., electronic control units in the vehicle 110). Further, as mentioned below, various devices and/or sensors 128 may provide data to a computer 116 via the vehicle network 124.

For example, the computer 116 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 116 may include an FPGA (Field-Programmable Gate Array) which is an integrated circuit manufactured to be configurable by an operator. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 116.

With continued reference to FIG. 1, the memory of a computer 116 can be of any suitable type, e.g., hard disk drives, solid state drives, servers, or any volatile or non-volatile media. The memory can store the collected data sent from the sensors 128. The memory can be a separate device from the computer 116, and the computer 116 can retrieve information stored by the memory via the vehicle network 124 in the vehicle 110, e.g., over a CAN bus, a wireless network, etc. Alternatively or additionally, the memory can be part of the computer 116, e.g., as a memory of the computer 116.

The computer 116 may be configured for communicating via a communication module 122 or interface with devices outside of the vehicle 110, such as a remote server 120. For example, the communication module 122 can be configured for one or more of vehicle-to-vehicle (V2V), vehicle-to-infrastructure or everything (V2X) or vehicle-to-everything including cellular communications (C-V2X) wireless communications (cellular, DSRC., etc.) to another vehicle 110, to an infrastructure element (typically via direct radio frequency communications) and/or (typically via the network 118) a remote server 120. The module could include one or more mechanisms by which the computers 116 of vehicles 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module can include cellular, Bluetooth, IEEE 802.11, dedicated short range communications (DSRC), cellular V2X (CV2X), and the like.

In one example, the communication module 122 allows the computer 116 to communicate with one or more remote sites such as the remote server 120, via the wide area network 118. The wide area network 118 can include one or more mechanisms by which a computer 116 may communicate with, for example, a remote server 120. Accordingly, the network 118 can include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks such as mentioned above, (e.g., using Bluetooth®, Bluetooth® Low Energy (BLE), IEEE 802.11, vehicle-to-vehicle (V2V) or vehicle-to-everything (V2X) such as cellular V2X (CV2X), Dedicated Short Range Communications (DSRC), etc.), local area networks (LAN) and/or wide area networks (WAN), including the Internet, providing data communication services.

The remote server 120 is typically a computing device including a processor and a memory and/or peripheral or additional memory or data storage, and may be configured for any suitable communication mechanism to communicate via the wide area network 118.

The computer 116 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computer 116, as opposed to a human operator, is to control such operations. Additionally, the computer 116 may be programmed to determine whether and when a human operator is to control such operations. The computer 116 may include or be communicatively coupled to, e.g., via a vehicle network 124 such as a communications bus as described further below, more than one processor, e.g., included in components such as sensors 128, electronic controller units (ECUs) or the like included in the vehicle 110 for monitoring and/or controlling various vehicle components, e.g., a powertrain controller included in a propulsion subsystem, a brake controller included in a braking subsystem, a steering controller 226 included in a steering subsystem 210, etc.

With continued reference to FIG. 1, the vehicle 110 includes a plurality of vehicle subsystems 126. A vehicle subsystem 126 is a set of components or parts, including hardware components and typically also software and/or programming, to perform a function or set of operations in the vehicle 110. The vehicle subsystems 126 typically include, without limitation, a braking subsystem, a propulsion subsystem, a steering subsystem 210, a lighting subsystem, and a user interaction or interface subsystem such as an HMI.

The braking subsystem can resist the motion of the vehicle 110 to thereby slow and/or stop the vehicle 110. The braking system may include friction brakes such as disc brakes, drum brakes, band brakes, and so on; regenerative brakes; any other suitable type of brakes; or a combination. The braking subsystem is in communication with and receives input from the computer 116 and/or a human operator. A human operator may control the braking system via, e.g., a brake pedal.

The propulsion subsystem converts energy to rotation of vehicle wheels to propel the vehicle 110 forward and/or backward. The propulsion subsystem may include one or more of an internal combustion engine, electric motor, hybrid engine, etc. The propulsion subsystem is in communication with and receives input from the computer 116 and/or a human operator. A human operator may control the propulsion subsystem via, e.g., an accelerator pedal.

Figure 2:
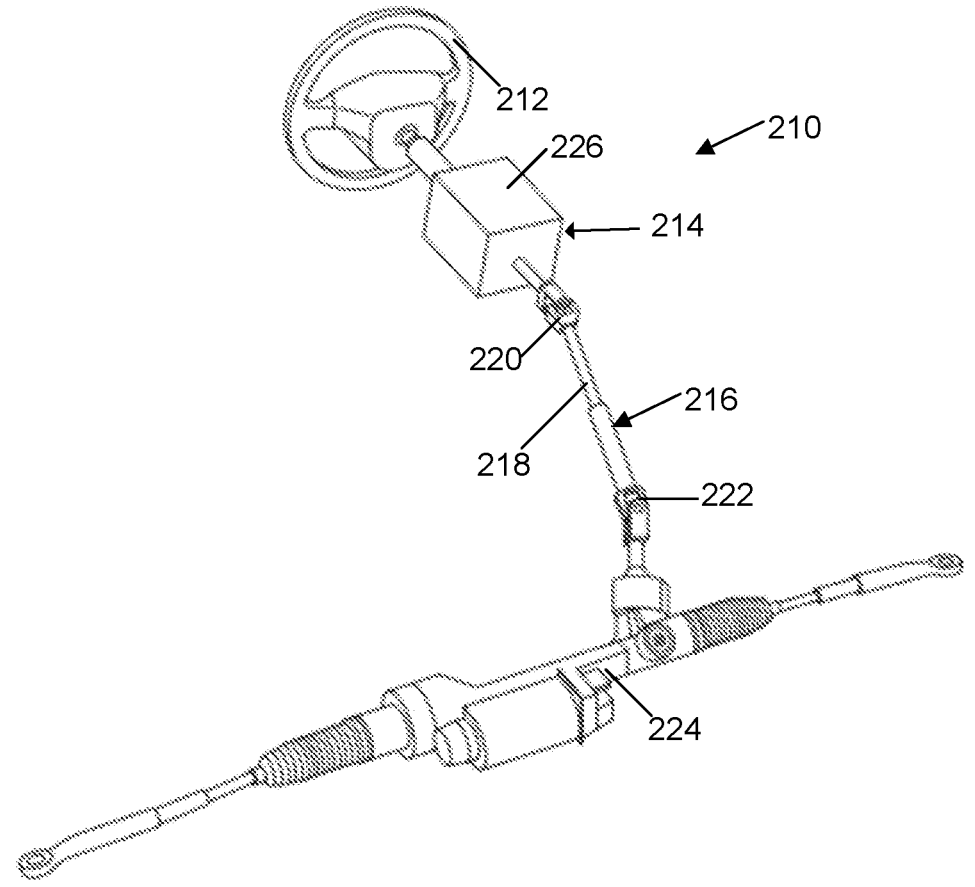
FIG. 2 is a diagram showing steering components of a vehicle.

FIG. 2 illustrates the steering subsystem 210 that may be used in a vehicle 110 to steer the vehicle 110 along a roadway 114. As shown in FIG. 2, the steering subsystem 210 is a set of mechanical and/or electromechanical components used to steer vehicle. The steering subsystem 210 can control a yaw, e.g., turning left and right, maintaining a straight path, etc., of the vehicle 110 as it moves. The steering subsystem 210 controls the turning of vehicle wheels. The steering subsystem 210 is in communication with and receives input from a steering wheel 212 and/or a steering motor 214 based on instructions from the computer 116. The steering subsystem 210 includes a steering column 216 coupled to the steering wheel 212 and/or steering motor 214. The steering wheel 212 and the steering column 216 are shown as being coupled to a shaft 218 via a coupling 220, which may include, for example, a universal joint. The shaft 218 utilizes a second coupling 222 to transmit torque applied by the operator or the steering motor 214. The steering subsystem 210 can further include bushings, seals, fluid couplings, steering rods, steering dampers, etc., which assist in controlling the heading of the vehicle 110 as the vehicle 110 moves along the roadway 114. The steering subsystem 210 may include a rack-and-pinion system with electric power-assisted steering, a steer-by-wire system, e.g., such as are known, or any other suitable system. It is noted that although FIG. 2 shows a steering wheel 212, techniques described herein can apply to steering elements other than a steering wheel 212, e.g., a joystick, an aircraft control yoke, etc.

The steering subsystem 210 may be operated in one of the hands-on mode or the hands-free mode. The steering subsystem 210 may be operated by a vehicle 110 by activation of a feature that may be, for example, a driver assistance application that controls the speed and steering of the vehicle 110 along the roadway 114. In one example, the steering subsystem 210 may be operated in the hands-free mode, e.g., the steering subsystem 210 being controlled by the computer 116 of the vehicle 110, and the steering subsystem 210 may be operated in the hands-on mode, e.g., the steering subsystem 210 being controlled by the computer 116 of the vehicle with an operator of the vehicle 110 having their hands on the steering wheel 212. As another example, the steering subsystem 210 may be operated in the hands-free mode, e.g., the steering subsystem 210 being controlled by the computer 116 of the vehicle 110, and the steering subsystem 210 may be operated in the hands-on mode, e.g., the steering subsystem 210 being controlled by an operator of the vehicle 110 having their hands on the steering wheel 212. Operation in the hands-on mode or the hands-free mode are both to laterally control the vehicle to maintain centered operation of the vehicle 110 on the roadway 114.

The steering motor 214 is included in the steering subsystem 210, e.g., drivably coupled to the steering column 216, so as to cause turning of the vehicle wheels. For example, the steering motor 214 may be rotatably coupled to the steering column 216, that is, coupled so as to be able to apply a steering torque to the steering column 216 and to a steering rack 224 that turns the vehicle wheels. The steering motor 214 may be an electric-power-assist-steering motor, i.e., provide power assist to the steering system. In other words, in some examples of the hands-on mode, the steering motor 214 may provide torque in a direction in which the steering wheel 212 is being rotated by a human operator and the steering motor 214 can apply torque to the steering column 216, allowing the driver to turn the steering wheel 212 with less effort. In the hands-free mode, the steering motor 214 can apply torque to the steering column 216 without input from the human operator based on instructions from the computer 116.

As described further below, the steering torque may be input to the steering subsystem 210. The steering torque may be applied to the steering column 216 to turn wheels of the vehicle 110. For example, when the vehicle 110 is in the hands-on mode, the input to the steering subsystem 210 may include input from an operator to the steering wheel 212 and the computer 116. As another example, when the vehicle 110 is in the hands-free mode, the input to the steering subsystem 210 may be from the steering motor 214 based on instructions from the computer 116.

The steering subsystem 210 may include a steering controller 226 electronically coupled to the computer 116 and the steering motor 214. The computer 116 may provide steering torques from the computer 116 that correspond to certain portions 112a, 112b, 112c of the roadway 114. When the vehicle 110 is to operate in the hands-free mode, the steering controller 226 commands the steering motor 214 to provide requested or requested steering torque. The steering motor 214 then applies the steering torque to turn the steering wheel 212 to operate the vehicle 110 along a curved portion 112b of the roadway 114.

The steering controller 226 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, steering controller 226 may include an FPGA (Field-Programmable Gate Array) which is an integrated circuit manufactured to be configurable by an operator.

Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a steering controller 226.

Vehicles 110 typically include a variety of sensors 128. A sensor 128 is a device that can obtain one or more measurements of one or more physical phenomena. Some sensors 128 detect internal states of the vehicle 110, for example, wheel speed, wheel orientation, and engine and transmission variables. Some sensors 128 detect the position or orientation of the vehicle 110, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors 128 detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors 128 are communications devices, for example, vehicle-to-infrastructure (V2I) or vehicle-to-vehicle (V2V) devices. Sensor 128 operation can be affected by obstructions, e.g., dust, snow, insects, etc. Often, but not necessarily, a sensor 128 includes a digital-to-analog converter to converted sensed analog data to a digital signal that can be provided to a digital computer, e.g., via a network. The sensors 128 can include a variety of devices, and can be disposed to sense and environment, provide data about a machine, etc., in a variety of ways. For example, various controllers in a vehicle 110 may operate as sensors 128 to provide data via the vehicle network 124 or bus, e.g., data relating to vehicle speed, acceleration, location, subsystem 126 and/or component status, etc. Further, other sensors 128, in or on a vehicle, stationary infrastructure element, etc., infrastructure could include cameras, short range radar, long range radar, LIDAR, and/or ultrasonic transducers, weight sensors, accelerometers, motion detectors, etc., i.e., sensors 128 to provide a variety of data. To provide just a few non-limiting examples, sensor data could include data for determining a position of a component, a location of an object, a speed of an object, a type of an object, a slope of a roadway 114, a temperature, a presence or amount of moisture, a fuel level, a data rate, etc.

Returning to FIG. 1, the vehicle sensors 128 include a steering torque sensor, which can be any suitable torque sensor that operates to measure torque, i.e., a steering torque, applied to the steering column 216. Steering torque herein means an actual, real-time or current torque, that may be applied to the steering column 216 by an input to the steering wheel 212, e.g., by an operator of the vehicle 110, or an input by actuating the steering motor 214 based on instructions from the computer 116, e.g., during the hands-free mode. In an example, the steering torque sensor is mounted to the steering subsystem 210. The steering torque sensor is located in the steering column 216 proximate to the steering wheel 212. The steering torque sensor may include a calibrated strain gauge, for example to provide a voltage signal that is proportional to torque applied to the steering subsystem. In an example, the steering torque sensor is capable of measuring torque at all times, or at practically all times, that an operator or the steering motor 214 steers the vehicle 110 along the roadway 114. In response to the vehicle 110 being steered in a straight direction, the steering torque sensor may measure zero torque or only a small amount of torque resulting from friction in the steering subsystem 210, for example. In an example implementation, the steering torque sensor can measure an overall or total torque to which a steering subsystem 210 is subjected, which can include torque applied by an operator of vehicle 110 or the computer 116. Overall torque measured by the steering torque sensor can include parasitic or frictional torque contributions, such as those applied by static and dynamic components of steering subsystem 210.

Figure 3:
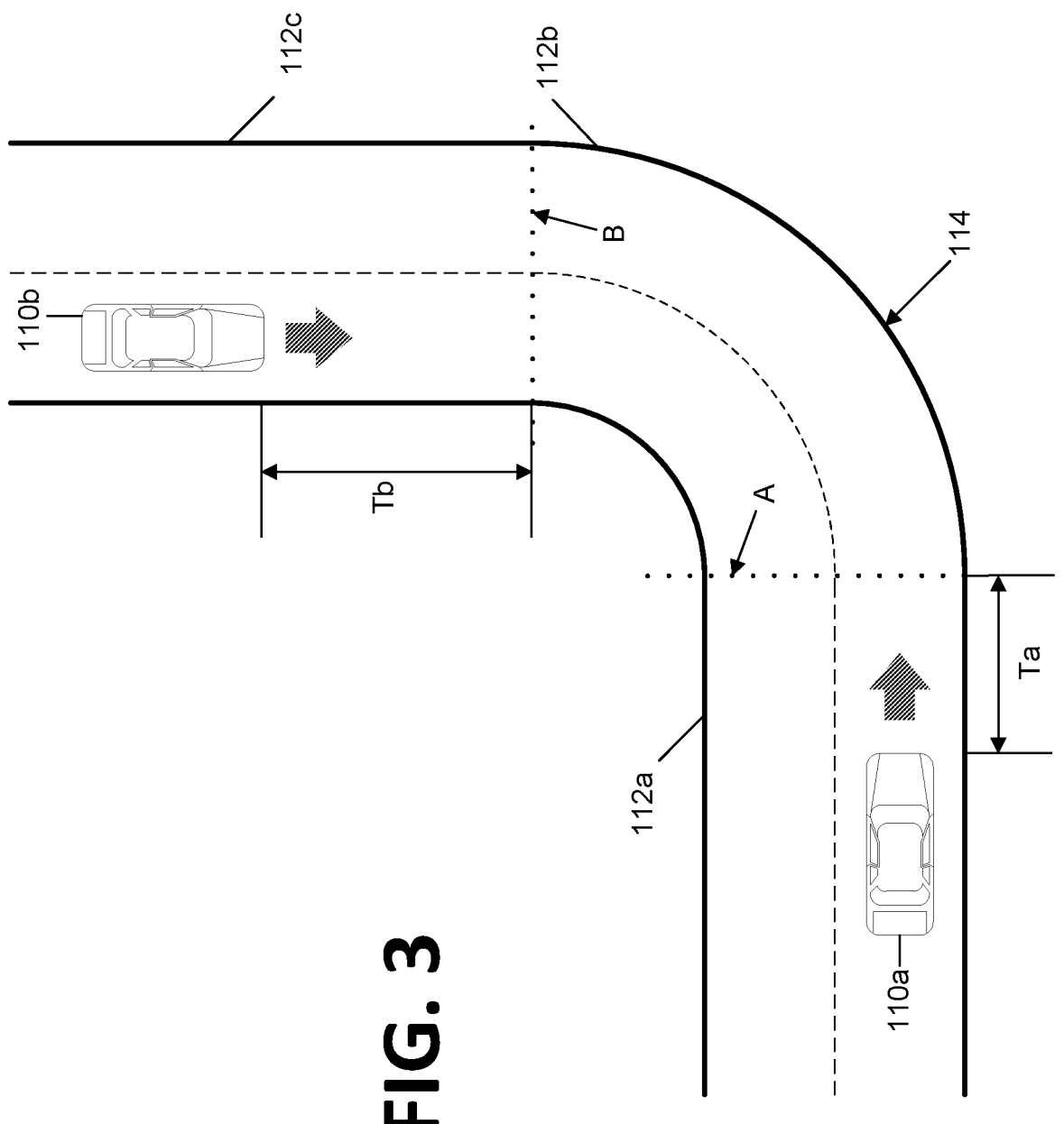
FIG. 3 is an example roadway for operating a vehicle with the vehicle spaced a distance from a curved portion of the roadway.
Figure 4:
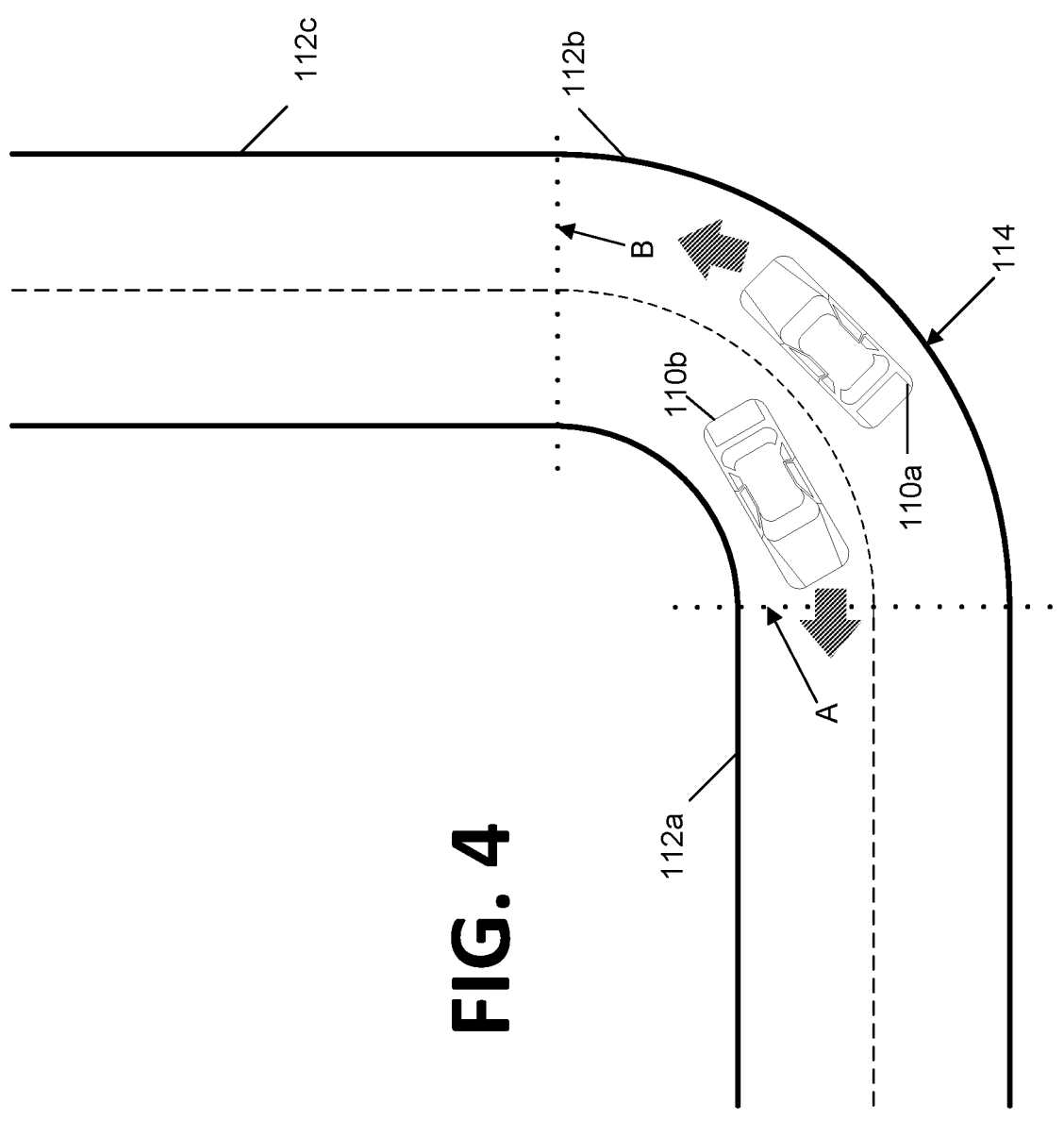
FIG. 4 is the example roadway with the vehicle operating along the curved portion of the roadway.

FIG. 3, showing an example roadway 114, shows a pair of vehicles 110a, b that are traveling in opposite directions along the roadway 114. A reference to vehicle 110 throughout this disclosure refers to a vehicle 110a and/or a vehicle 110b. A roadway 114 that the vehicle 110 is following may be broken into different portions 112a, 112b, 112c. In the examples shown in FIGS. 3 and 4, the portion 112a is a generally straight portion of the roadway 114, the portion 112b is a curved portion of the roadway 114 having an example radius of curvature, and the portion 112c is a second portion that is generally straight portion of the roadway 114. Straight portions of the roadway 114, e.g., the portions 112a and 112c, may start and/or end when the curved portions, e.g., the portion 112b, begin. Curved portions 112b may begin when the roadway 114 begins to have a radius, as indicated in FIGS. 3 and 4 by lines A and B. In the examples shown in FIGS. 3 and 4, the curved portion, e.g., portion 112b, indicates a 90 degree turn by a vehicle 110, however, in other examples, the curved portion, 112b, may be of any radius or any degree of turning by the vehicle 110. The curved portions 112b may be identified using location data of the vehicle 110.

The vehicle 110 may operate in a selected steering mode, i.e., in a hands-free mode or a hands-on mode. In other words, the computer 116 selects a steering mode as the vehicle 110 is operating along the roadway 114. Operating in the selected steering mode may include to actuate vehicle components to operate the vehicle 110 in the selected mode or to disable certain vehicle components to operate the vehicle 110 in the selected mode. As the vehicle 110 operates along the roadway 114, the computer 116 identifies whether the hands-free mode is available. The computer 116 may use any suitable data to determine that the hands-free mode is available along the roadway 114. Location data, e.g., map data, may be used to determine the hands-free mode is available. If the hands-free mode is available, the computer 116 selects the hands-free mode. If the hands-free mode is not available, the computers 116 selects the hands-on mode.

As the vehicle 110 operates along the roadway 114, the computer 116 may select one of the hands-free mode or the hands-on mode for a curved portion 112b of the roadway 114. As shown in FIG. 3, as the vehicle 110 is approaching the portion 112b of the roadway 114 and is within a threshold time T of the curved portion 112b, e.g., determined by a speed of the vehicle and a time from the curved the curved portions 112b, the selection of the steering mode may be initiated. "Approaching" herein means that the vehicle 110 is moving along the roadway 114 toward the curved portion 112b of the roadway 114 and are within a specified time T away from the curved portion 112b of the roadway 114. The threshold time T is determined to provide sufficient time to determine a steering mode for operating the vehicle 110 in the portion 112*b*. As an example, the threshold time T may be determined dynamically, e.g., determined in real-time, based on speed and/or location data of the vehicle 110. In another example, the threshold time T may be a pre-stored time applied to any curved portion 112*b* as the vehicle 110 approaches the curved portion 112*b* or a pre-stored for the specific curved portion 112*b*. The computer 116 may identify that the vehicle 110 is within the threshold time T by comparing a current vehicle location to a location defining a boundary of the portion 112*b*, e.g., line A or B as shown in FIGS. 3 and 4. For example, the vehicle 110*a* is within the threshold time T of the curved portion 112*b* at line A and the vehicle 110*b* Is within the threshold time Tb of the curved portion 112*b* at line B.

The computer 116 determines a current speed and lateral accelerations of the vehicle 110 as the vehicle 110 approaches the curved portion 112*b*. A speed of the vehicle 110 can be determined based on speed sensor data, for example, and refers to a speed of the vehicle 110 relative to a ground surface, e.g., of a roadway 114. A speed threshold may be determined based on the curvature of the roadway 114. The speed threshold is typically specified as an upper limit of the speed that maintains hands-free mode operation of the vehicle 110 along the curved portion 112*b*. In other words, when the speed of the vehicle 110 is too great, the vehicle 110 may operate in the hands-free mode based on the determined vehicle 110 speed without reference to factors such as lateral acceleration, steering torque, etc.

A lateral acceleration of the vehicle 110 can be determined from vehicle accelerometer sensor data, for example. "Lateral" refers to a sideways dimension relative to the vehicle 110. For example, the vehicle 110 can have a longitudinal axis defining a length of the vehicle 110 from front to back, and a lateral axis that is perpendicular to the longitudinal axis defining a width of the vehicle 110 from side-to-side. A lateral acceleration is an acceleration in the sideways dimension, i.e., measured along the lateral axis, of the vehicle 110. A permitted lateral acceleration may be determined for a curved portion 112*b* of the roadway 114 based on the roadway 114 along which the vehicle 110 is operating. The permitted lateral acceleration and the lateral acceleration may be based on the curvature of the roadway 114 and the speed of the vehicle 110. The threshold lateral acceleration and the lateral acceleration may be defined by the following equation, wherein ay represents the threshold lateral acceleration or the lateral acceleration, v represents a speed of the vehicle 110, and R represents a radius of curvature of the roadway 114.

$$a_y = \frac{v^2}{R}$$

The permitted lateral acceleration is typically specified as an upper limit on the lateral acceleration at which the vehicle 110 maintains operation in the hands-free mode along a curved portion 112*b* of the roadway 114. The permitted lateral acceleration may provide a margin of error from a maximum lateral acceleration at which the vehicle 110 is capable of maintaining operation in the hands-free mode along curved portion 112*b* of the roadway 114. That is, when the vehicle 110 is navigating a curved portion 112*b* of the roadway 114, the maximum lateral acceleration to maintain the vehicle 110 centered in a lane of the roadway 114 can be specified as the permitted lateral acceleration.

If the lateral acceleration and/or the speed are greater than the permitted lateral acceleration and the speed threshold for the curved portion 112*b* as the vehicle 110 approaches the curved portion 112*b*, the computer 116 may decrease the current speed of the vehicle 110 to operate on the curved portion 112*b*. In other words, the speed adjusted to be below the speed threshold and, in turn, the lateral acceleration decreases to or below the permitted lateral acceleration for the curved portion 112*b* of the roadway 114. The computer 116 may make a selection of the hands-free mode or the hands-on mode based on the speed and lateral acceleration compared to the speed threshold and the permitted lateral acceleration. If the speed and lateral acceleration are not adjusted, the computer 116 can select the hands-on mode to operate on the curved portion 112*b*. As described further below, if the speed and lateral acceleration are adjusted or if the speed and lateral acceleration are below the speed threshold and permitted lateral acceleration, the computer 116 determines the steering torque for the curved portion 112*b*.

If the lateral acceleration and the speed of the vehicle 110 is within the speed threshold and the permitted lateral acceleration for the curved portion 112*b*, either by adjustment or to begin with, the computer 116 may determine a requested steering torque for the curved portion 112*b* when the vehicle 110 is within the threshold time T. The requested steering torque is the steering torque requested by the steering subsystem 210 to navigate the curved portion 112*b* of the roadway 114. The computer 116 may select one of the hands-free mode or the hands-on mode based on the requested steering torque and whether the requested steering torque exceeds a threshold steering torque. The threshold steering torque may be a steering torque that is relative to the control limits of the steering subsystem 210. The control limits are typically based on design limits specified for the steering subsystem 210 when operated by the steering motor 214 under various operating conditions, e.g., speeds, yaw rates, and/or lateral accelerations. The requested steering torque may depend on the speed of the vehicle 110 and/or the lateral acceleration of the vehicle 110. The requested steering torque may increase when the speed and lateral acceleration increase and the requested steering torque may decrease when the speed and the lateral acceleration decrease.

The requested steering torque for the curved portion 112*b* relates to a steering torque for the steering subsystem 210 to apply to maintain hands-free operation along the curved portion 112*b*. The computer 116 may identify from stored data the steering torque requested for the vehicle 110 that corresponds to the curvature of the curved portion 112*b*, e.g., at a curve radius, and that corresponds to the speed and/or lateral acceleration of the vehicle 110 when the vehicle 110 operates on the curved portion 112*b*, which is discussed further below.

The selection of the steering mode may be initiated or triggered once the lateral acceleration of the vehicle 110, the speed, and the steering torque are all within permitted limits/thresholds. The requested steering torque for the curved portion 112*b* may be compared to the steering torque threshold determined for the curved portion 112*b*. The steering torque threshold is a maximum amount of steering torque that the steering subsystem 210 may provide when the vehicle 110 is operating in the hands-free mode. The steering torque threshold may be based on the curvature of the roadway 114, the speed of the vehicle 110, and the lateral acceleration of the vehicle 110 as the vehicle 110 is driving along the curved portion 112*b*. The steering torque threshold may vary depending on a curvature of the roadway 114, a speed of the vehicle 110 on the roadway 114, a lateral acceleration of the vehicle 110 on the roadway 114, etc. The steering torque threshold increases with the size of the curvature of the roadway 114, e.g., a relatively small curvature typically results in a relatively larger steering torque threshold and a relatively larger curvature typically results in relatively lesser steering torque threshold. The greater the speed and the lateral acceleration, the greater the steering torque threshold. For example, when the vehicle 110 is navigating the curved portion 112b of the roadway 114, the steering torque to keep the vehicle 110 centered in a lane of the roadway 114 should not exceed the steering torque threshold.

The steering torque threshold, permitted lateral acceleration, and speed threshold for various curvatures for curved portions 112b can be determined empirically and/or based on simulation. For example, the lateral acceleration, the speed, and the steering torque threshold can be measured from many sample curves, sample vehicle 110 and/or steering subsystems 210, and/or simulations thereof to select a threshold steering torque, the permitted lateral acceleration, and speed for the curved portions 112b. For example, lateral acceleration data, speed, and steering torque data may be collected from sample vehicle 110 of various types, sizes, weights, etc., which may be operated or simulated along various real-world roadways 114 and/or roadways 114 at testing facilities, and where the roadways 114 have various curvatures to determine the maximum speeds, maximum lateral accelerations, and maximum steering torque that can be applied at various speeds at respective curvatures and/or types of curvatures and roadways 114. The speed threshold, the permitted lateral acceleration, and the steering torque thresholds for various types of curvatures and roadways 114 can then be set at some value below the maximum steering torque. For example, based on empirical data, the thresholds can be multiplied by a factor of e.g., a value less than one, to set the thresholds to a value that is less than a maximum steering torque, speed, and lateral acceleration for various curvatures and roadways 114. The factor may be determined based on a margin of error of the steering subsystem 210 selected by designers to maintain the vehicle 110 operation on curved portions 112b along the roadway 114.

The computer 116 can select the steering mode, i.e., one of the hands-free mode or the hands-on mode based on the steering torque requested for the curved portion 112b. When the vehicle 110 is in the hands-free mode, the computer 116 provides an input to the steering controller 226 to activate the steering motor 214 to steer the vehicle 110 along the roadway 114. In the hands-free mode, the operator of the vehicle 110 may not need to contact the steering wheel 212, i.e., operator input is not requested to control steering in the hands-free mode. When the vehicle 110 is in hands-on mode, the operator of the vehicle 110 provides the input to the steering subsystem 210 to control vehicle steering, e.g., the operator may turn the steering wheel 212 to steer the vehicle 110 along the roadway 114 in addition to the computer 116 providing input to the steering subsystem 210.

When the computer 116 selects one of the steering modes, the vehicle 110 may transition from the other of the modes to the selected mode. In other words, the vehicle 110 may transition between the hands-free mode and the hands-on mode. As an example, if the vehicle 110 is operating in the hands-on mode and the hands-free mode is selected, the vehicle 110 may transition from the hands-on mode to the hands-free mode. As another example, if the vehicle 110 is operating in the hands-free mode and the hands-on mode is selected, the vehicle 110 may transition from the hands-free mode to the hands-on mode.

FIG. 4 illustrates the pair of vehicles 110a, b moving along the curved portion 112b of the roadway 114. Although the vehicles 110a, b are moving along the same curved portion 112b of the roadway 114, the vehicles 110a, b may experience different steering torque considerations. For example, the portion of the curved portion 112b along which the vehicle 110a is moving has a larger radius relative to the portion of the curved portion 112b along which the vehicle 110b is moving. The requested steering torque may be larger for the vehicle 110b than the requested steering torque for the vehicle 110a due to the smaller radius of the curved portion 112b. Additionally, the vehicle 110b may operate at a lower speed than the vehicle 110a to reduce the request steering torque and reduce the lateral acceleration.

Data related to the steering torque, speed, and lateral accelerations that has been empirically determined may be stored in the computer 116 within tables for comparison as the vehicle 110 operates. Selection of the hands-free mode may be determined based on ranges of the steering torque, speed, and lateral acceleration for curved portions 112b of the roadway 114. For example, various radii of curvature may include ranges of steering torques, speeds, and lateral accelerations that may be permitted along the curved portions 112b of the roadway 114 for the vehicle 110 to operate in the hands-free mode. When the requested steering torque, lateral acceleration, and/or speed are not within the steering torque threshold, permitted lateral acceleration, and/or the speed threshold stored in the tables, the computer 116 may select the hands-on mode or make adjustments to the speed.

The computer 116 may select a steering mode, i.e., one of the hands-free mode or the hands-on mode to be applied for multiple, e.g., consecutive or contiguous, curved portions 112b of the roadway 114. In other words, once a vehicle 110 has exited a first curved portion 112b of the roadway 114, the vehicle 110 may continue to identify additional curved portions 112b of the roadway 114 as the vehicle 110 is approaching and/or entering a second curved portion 112b along the roadway 114. For the additional curved portion 112b, the computer 116 may select one of a hands-on mode and a hands-free mode for operating the vehicle 110 along the additional curved portion 112b of the roadway 114 based on the same evaluations of the steering torque, speed, and lateral acceleration as for the first curved portion 112b.

Figure 5:
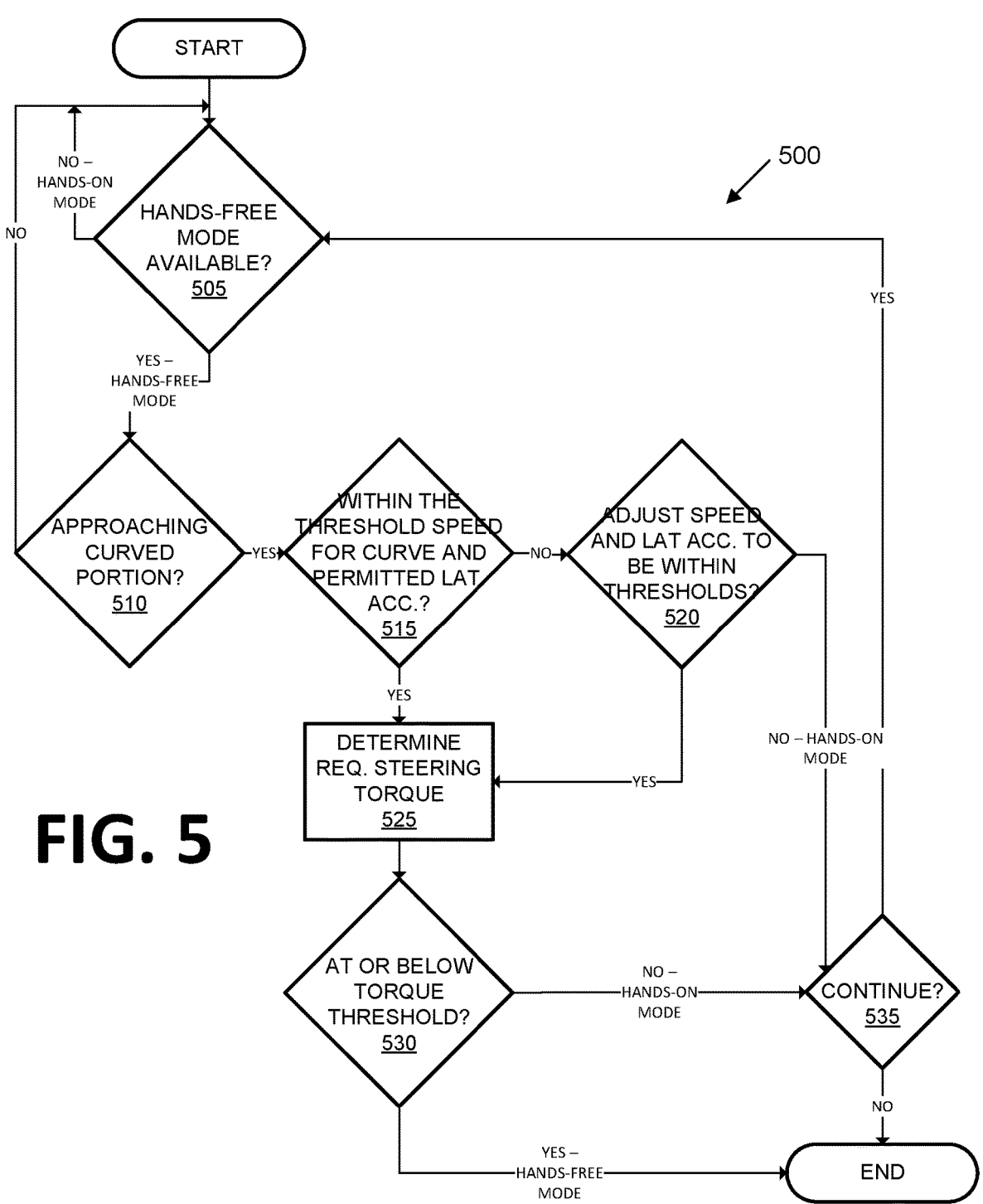
FIG. 5 is a flowchart of an example process for controlling the vehicle system.

With reference to FIG. 5, the computer 116 stores instructions to control components of the vehicle 110 according to a computer-implemented method such as the process 500. Specifically, the process 500 includes selecting the steering mode, based on the parameters and conditions as discussed above.

In decision block 505, based on activation of a feature of the vehicle 110, e.g., an adaptive cruise control feature and/or a hands-free driving feature, e.g., as offered by Ford Motor Company as BlueCruise™, by the operator that includes the hands-free mode, the computer 116 determines whether the hands-free mode is available for the vehicle 110 to operate along the roadway 114. The computer 116 may use location data, e.g., map data, of the vehicle 110 to determine that the vehicle 110 is in a location along the roadway 114 along which the hands-free mode may be available. If the hands-free mode is available, the hands-free mode is selected and the process 500 moves to decision block 510. If the hands-free mode is not available, the hands-on mode is selected and the process 500 returns to decision block 505 to re-evaluate whether the hands-free mode is available.

In decision block 510, the computer 116 determines whether the vehicle 110 is approaching a curved portion 112*b* of the roadway 114. For example, the computer 116 may identify the curved portion 112*b* of the roadway 114 using location data, e.g., map data. Identifying the portion 112*b* of the roadway 114 may include identifying that the vehicle 110 is within the threshold time T of the curved portion 112*b* of the roadway 114. If the computer 116 determines that the vehicle 110 is approaching the curved portion 112*b* of the roadway 114, the process 500 continues to decision block 515. If no curved portion 112*b* is identified by the computer 116, the process 500 returns to decision block 505 to again determine whether the hands-free mode is available for the vehicle 110 to operate along the roadway 114.

In decision block 515, based on identifying that the vehicle 110 is approaching a curved portion 112*b*, the computer 116 determines whether the speed and lateral acceleration of the vehicle as it is currently operating are within thresholds for the curved portion 112*b* of the roadway 114. Regarding the speed of the vehicle 110, the computer 116 may compare the current speed to an upper limit speed and a lower limit speed, e.g., the speed threshold as described above, for the curved portion 112*b*. Additionally, the current lateral acceleration is compared to a permitted lateral acceleration for the curved portion 112*b*. If the speed is greater than the threshold specified by the thresholds for speed and/or if the lateral acceleration is above the permitted lateral acceleration, the process 500 moves to decision block 520. Should the speed and lateral acceleration be within the speed threshold and permitted lateral acceleration, the process 500 moves to block 525.

In decision block 520, based on determining the speed and lateral acceleration are outside the permitted thresholds, the computer 116 may adjust the speed and lateral accelerations to be within the permitted thresholds of the curved portion 112*b*. Adjusting the speed may include decreasing the speed to be below the upper limit of the speed for the curved portion 112*b*. Because the lateral acceleration may be speed dependent, the speed being adjusted will likely result in an adjusted lateral acceleration. If the speed and the lateral acceleration are adjusted to be below the thresholds, the process 500 continues to block 525 to determine a requested steering torque. If the speed and the lateral acceleration are not adjusted, the process 500 continues to block 535 and the hands-on mode is selected.

In block 525, based on either determining that the speed and the lateral acceleration are within thresholds discussed above, the computer 116 determines the requested steering torque for the curved portion 112*b* of the roadway 114. The requested steering torque relates to a steering torque that the steering subsystem 210 may use to maintain hands-free operation along the curved portion 112*b*. The computer 116 may identify from stored data the steering torque requested for the vehicle 110 that corresponds to the curvature of the curved portion 112*b*, e.g., at a curve radius, and that corresponds to the speed and/or lateral acceleration of the vehicle 110 when the vehicle 110 operates on the curved portion 112*b*. Upon determining the requested steering torque for the curved portion 112*b*, the process 500 continues to decision block 530.

In decision block 530, based on determining the requested steering torque for the curved portion 112*b*, the requested steering torque is compared to the steering torque threshold to determine whether the requested steering torque is at or below the threshold for the curved portion 112*b*. The computer 116 may compare the requested steering torque to stored steering torque thresholds that correspond to the curvature of the curved portion 112*b*. The steering torque threshold is based on the limitations of the steering subsystem 210 to maintain the vehicle 110 operation along the curved portion 112*b* at the current speed and lateral acceleration. If the requested steering torque is greater than the steering torque threshold, the computer 116 selects the hands-on mode and the process 500 continues to decision block 535. If the requested steering torque is below the steering torque threshold, the computer 116 selects the hands-free mode to maintain the hands-free mode along the curved portion 112*b* and the process 500 ends.

In decision block 535, which may follow block 520 and 530, the computer 116 determines whether the process 500 should continue. The process 500 may discontinue for any suitable reason, e.g., the vehicle 110 is turned off. If the process 500 is not to continue, the process 500 ends following block 535. Otherwise, the process 500 returns to decision block 505 to identify an additional curved portion 112*b* of the roadway 114.

Executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data (e.g., instructions), which may be read by a computer 116. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer 116 can read.

Use of "in response to," "based on," and "upon determining" herein indicates a causal relationship, not merely a temporal relationship.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system comprising:
a computer including a processor and a memory storing instructions executable by the processor to:
determine a steering torque, a speed, and a lateral acceleration of a vehicle; and
select one of a hands-on mode or a hands-free mode for operating the vehicle along a portion of the roadway based on comparing the steering torque to a steering torque threshold, comparing the speed to a speed threshold, and comparing the lateral acceleration to a threshold lateral acceleration.

2. The system of claim 1, wherein the instructions further include instructions to select the hands-on mode at the portion of the roadway is further based on the lateral acceleration and the steering torque exceeding the threshold lateral acceleration and the steering torque threshold.

3. The system of claim 1, wherein the speed threshold includes an upper limit and wherein the instructions further include to, based on a determination that the speed is greater than the speed threshold, adjust the speed to be below the upper limit.

4. The system of claim 1, wherein the steering torque threshold is based on the lateral acceleration.

5. The system of claim 1, wherein the steering torque threshold is based on the speed of the vehicle.

6. The system of claim 1, wherein the selection is initiated based on approaching a curved portion of the roadway upcoming within a specified time from the curved portion.

7. The system of claim 1, wherein the selection of one of the hands-on mode or the hands-free mode is initiated based on the speed of the vehicle being greater than an upper limit.

8. The system of claim 1, wherein the instructions further include instructions to select one of the hands-on mode and the hands-free mode for operating the vehicle along a second portion of the roadway.

9. A method comprising:
determining a steering torque, a speed, and a lateral acceleration of a vehicle; and
selecting one of a hands-on mode or a hands-free mode for operating the vehicle along a portion of the roadway based on comparing the steering torque to a steering torque threshold, comparing the speed to a speed threshold, and comparing the lateral acceleration to a threshold lateral acceleration.

10. The method of claim 9, wherein selecting the hands-on mode at the portion of the roadway is further based on the lateral acceleration and the steering torque exceeding the threshold lateral acceleration and the steering torque threshold.

11. The method of claim 9, wherein the speed threshold includes an upper limit and further comprising, based on a determination that the speed is greater than the speed threshold, adjusting the speed to be below the upper limit.

12. The method of claim 9, wherein the steering torque threshold is based on the lateral acceleration.

13. The method of claim 9, wherein the steering torque threshold is based on the speed of the vehicle.

14. The method of claim 9, wherein the selection is initiated based on approaching a curved portion of the roadway upcoming within a specified time from the curved portion.

15. The method of claim 9, wherein the selection of one of the hands-on mode or the hands-free mode is initiated based on the speed of the vehicle being greater than an upper limit.

16. The method of claim 9, further comprising selecting one of the hands-on mode and the hands-free mode for operating the vehicle along a second portion of the roadway.

17. The system of claim 1, wherein selection of the hands-on mode or hands-free mode is initiated based on approaching a curved portion of the roadway upcoming within a specified time from the curved portion.

18. The system of claim 1, wherein the selection of one of the hands-on mode or the hands-free mode is initiated based on a speed of the vehicle being greater than an upper limit.

* * * * *